United States Patent
Wu et al.

(10) Patent No.: US 9,479,342 B2
(45) Date of Patent: Oct. 25, 2016

(54) CHARGING METHOD AND APPARATUS FOR PROXIMITY-BASED SERVICE

(71) Applicant: HTC Corporation, Taoyuan, Taoyuan County (TW)

(72) Inventors: Chih-Hsiang Wu, Taoyuan (TW); Ching-Yu Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 55 days.

(21) Appl. No.: 14/212,790

(22) Filed: Mar. 14, 2014

(65) Prior Publication Data
US 2014/0273943 A1    Sep. 18, 2014

Related U.S. Application Data

(60) Provisional application No. 61/784,736, filed on Mar. 14, 2013.

(51) Int. Cl.
| | |
|---|---|
| *H04M 11/00* | (2006.01) |
| *H04L 12/14* | (2006.01) |
| *H04M 15/00* | (2006.01) |
| *H04W 4/24* | (2009.01) |

(Continued)

(52) U.S. Cl.
CPC .......... *H04L 12/1485* (2013.01); *H04M 15/66* (2013.01); *H04M 15/8033* (2013.01); *H04W 4/20* (2013.01); *H04W 4/24* (2013.01); *H04W 76/023* (2013.01)

(58) Field of Classification Search
CPC ..... H04W 76/023; H04W 4/24; H04W 4/20; H04L 12/1485; H04M 15/66; H04M 15/8033
See application file for complete search history.

(56) References Cited

U.S. PATENT DOCUMENTS

| | | | | |
|---|---|---|---|---|
| 2007/0258361 | A1* | 11/2007 | McEwen | H04L 12/5695 370/229 |
| 2010/0009675 | A1* | 1/2010 | Wijting et al. | 455/426.1 |
| 2011/0069661 | A1* | 3/2011 | Waytena, Jr. | H04L 63/102 370/328 |

(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.0.0, Jun. 2012, pp. 1-302.

(Continued)

*Primary Examiner* — Ajit Patel
(74) *Attorney, Agent, or Firm* — Birch, Stewart, Kolasch & Birch, LLP

(57) ABSTRACT

A charging method for Proximity-based Service (ProSe) used in a first user equipment (UE) of a wireless communication system is disclosed. The charging method includes: establishing a ProSe service with a second UE; generating charging information for the ProSe service according to collected transmission information, wherein the ProSe service is between the first UE and a second UE in proximity and comprises ProSe discovery, ProSe communication or both, and wherein the transmission information comprises at least one of: radio resources dedicated for the ProSe service, allocated to the first UE by the a base station of the wireless communication system; at least one traffic volume report corresponding to uplink or downlink data volume, transmitted to the base station; and a time-elapsed duration for the ProSe service; and transmitting the charging information for the ProSe service to the base station or a core network entity of the wireless communication system.

3 Claims, 7 Drawing Sheets

(51) Int. Cl.
H04W 4/20 (2009.01)
H04W 76/02 (2009.01)

(56) References Cited

U.S. PATENT DOCUMENTS

| | | | |
|---|---|---|---|
| 2013/0315079 A1* | 11/2013 | Edge | 370/252 |
| 2014/0213306 A1* | 7/2014 | Blankenship et al. | 455/457 |
| 2014/0242939 A1* | 8/2014 | Salot et al. | 455/406 |
| 2014/0364079 A1* | 12/2014 | DiFazio et al. | 455/404.1 |
| 2015/0043429 A1* | 2/2015 | Kim et al. | 370/328 |
| 2015/0087233 A1* | 3/2015 | Kim et al. | 455/41.2 |

OTHER PUBLICATIONS

3GPP, "3rd Generation Partnership Project; Technical Specification Group SA; Feasibility Study for Proximity Services (ProSe) (Release 12)", 3GPP TR 22.803, V1.0.0, Aug. 2012, pp. 1-33.

ETSI, "Digital cellular telecommunications system (Phase 2+); Universal Mobile Telecommunications System (UMTS); LTE; Telecommunication management; Charging management; Charging architecture and principles (3GPP TS 32.240 version 11.5.0 Release 11)", ETSI TS 132 240, V11.5.0, Sep. 2012, pp. 1-47.

ETSI, "Digital cellular telecommunications system (Phase 2+); Universal Mobile Telecommunications System (UMTS); LTE; Telecommunication management; Charging management; Charging Data Record (CDR) parameter description (3GPP TS 32.298 version 11.5.0 Release 11)", ETSI TS 132 298, V11.5.0, Jan. 2013, pp. 1-158.

ETSI, "LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11)", ETSI TS 136 300, V11.3.0, Nov. 2012, pp. 1-217.

ETSI, "LTE; Evolved Universal Terrestrial Radio Access (E-UTRA); Radio Resource Control (RRC); Protocol specification (3GPP TS 36.331 version 11.1.0 Release 11)", ETSI TS 136 331, V11.1.0, Nov. 2012, pp. 1-329.

ETSI, "LTE; General Packet Radio Service (GPRS) enhancements for Evolved Universal Terrestrial Radio Access Network (E-UTRAN) access (3GPP TS 23.401 version 11.4.0 Release 11)", ETSI TS 123 401, V11.4.0, Jan. 2013, pp. 1-286.

* cited by examiner

CHARGING METHOD AND APPARATUS FOR PROXIMITY-BASED SERVICE

CROSS REFERENCE TO RELATED APPLICATIONS

The present application is based on, claims the benefit of U.S. Provisional Application No. 61/784,736, filed on Mar. 14, 2013, the entirety of which is incorporated by reference herein.

TECHNICAL FIELD

Aspects of the present invention relate generally to a method for wireless communications systems, and more particularly, to a charging method for Proximity-based Service (ProSe) utilized in a user equipment (UE), an evolved Node B (eNB) and a mobility management entity (MME) in wireless communications systems.

BACKGROUND

In a typical mobile communications environment, a user equipment (UE), including a mobile phone (also known as a cellular or cell phone), a laptop computer with wireless communications capability, or a personal digital assistant (PDA), etc., may communicate voice and/or data signals with one or more service network. The wireless communications between the UE and the service networks may be in compliance with various wireless technologies. A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network, Evolved Packet Core (EPC), including a mobility management entity (MME), a serving gateway (SGW), a packet data network gateway (PGW), etc., for NAS (Non Access Stratum) control. A long term evolution-advanced (LTE-A) system, as its name implies, is an evolution of the LTE system and has similar network structure as the LTE system.

In LTE-related systems, Proximity-based Service (ProSe) communication is developed as a technology which allows UEs to directly communicate with each other in close proximity without transmitting/receiving data and/or control signals to the other via an eNB, which means a local or direct path can be used between the UEs. Therefore, in 3GPP LTE spectrum, the operator can move the data path (i.e., user plane) off the access to core networks to direct links between the UEs.

Currently, charging functionality is provided by a user plane node, e.g., a SGW or PGW. However, when the UEs communicate with each other directly via the ProSe communication in a data path and/or a control path, there is no user plane traffic traversing through the user plane node. As a result, the user plane node may not obtain the charging information for the ProSe communication.

SUMMARY

A detailed description is given in the following embodiments with reference to the accompanying drawings.

A charging method for proximity-based service (ProSe) communication utilized in a UE, an eNB and a MME in wireless communications systems and a related communications device are provided.

In one exemplary embodiment, the invention is directed to a charging method for Proximity-based Service (ProSe), wherein the charging method is used in an evolved Node B (eNB) of a wireless communication system, comprising: generating charging information for a ProSe service according to collected transmission information, wherein the ProSe service is between a first user equipment (UE) and a second UE in proximity and t comprises ProSe discovery, ProSe communication or both, and wherein the collected transmission information comprises at least one of: (a) radio resources dedicated for the ProSe service allocated to the first UE and/or the second UE by the eNB; (b) at least one traffic volume report corresponding to uplink or downlink data volume, transmitted from the first UE and/or the second UE; and (c) a time-elapsed duration for the ProSe service.

In one exemplary embodiment, the invention is directed to a charging method for Proximity-based Service (ProSe), wherein the charging method is used in a first user equipment (UE) of a wireless communication system, comprising: establishing a ProSe service with a second UE; generating charging information for the ProSe service according to collected transmission information, wherein the ProSe service is between the first UE and a second UE in proximity and comprises ProSe discovery, ProSe communication or both, and wherein the transmission information comprises at least one of: (a) radio resources dedicated for the ProSe service, allocated to the first UE by the a base station of the wireless communication system; (b) traffic volume report corresponding to uplink or downlink data volume, transmitted to the base station; and (c) a time-elapsed duration for the ProSe service; and transmitting the charging information for the ProSe service to the base station or a core network entity of the wireless communication system.

In one exemplary embodiment, the invention is directed to a charging method for proximity-based Service (ProSe), wherein the charging method is used in a mobility management entity (MME) of a wireless communication system, the method comprising: allocating an evolved packet system (EPS) bearer identity (ID) dedicated for a ProSe service established by a first user equipment (UE) for communicating with a second UE and/or indicating charging characteristics associated with the ProSe service between the first UE and the second UE in a Create Session Request message which is to be transmitted to a packet data network gateway (PGW) through a serving gateway (SGW), when a dedicated EPS bearer is activated for the ProSe service or when a dedicated PDN connection is created for the ProSe service; receiving a Create Session Response message including a charging ID from the PGW through the SGW; and transmitting at least one of the dedicated EPS bearer ID, the associated charging characteristics, and a charging ID to at least one evolved Node B (eNB) serving the first UE and the second UE.

In one exemplary embodiment, the invention is directed to a communications device for Proximity-based Service (ProSe) in a wireless communication system, comprising: a control circuit; a processor installed in the control circuit; a memory installed in the control circuit and operatively coupled to the processor; wherein the processor is configured to execute a program code stored in the memory to process the following: establishing a ProSe service with another communication device in the wireless communication system, wherein the ProSe service comprises ProSe discovery, ProSe communication or both, and generating charging information for the ProSe service according to collected transmission information, wherein the transmission information comprises at least one of: (a) radio resources dedicated for the ProSe service, allocated to the communication device by a base station of the wireless communication system; (b) traffic volume report transmitted to the base station; and (c) a time-elapsed duration for the ProSe service with the another communication device; and transmitting the charging information for the ProSe service to the base station or a core network entity of the wireless communication system.

In one exemplary embodiment, the invention is directed to a charging method for Proximity-based Service (ProSe), wherein the charging method is used in a core network entity of a wireless communication system, comprising: generating charging information for a ProSe service according to collected transmission information, wherein the ProSe service is between a first user equipment (UE) and a second UE in proximity and comprises ProSe discovery, ProSe communication or both, and wherein the collected transmission information comprises at least one of: (a) at least one traffic volume report corresponding to uplink or downlink data volume, transmitted from the first UE and/or the second UE; (b) a time-elapsed duration for the ProSe service; and (c) the number of times for which the authorization for the ProSe service is accepted by the core network entity.

A detailed description is given in the following embodiments with reference to the accompanying drawings.

DRAWINGS

The present invention can be more fully understood by reading the subsequent detailed description and examples with references made to the accompanying drawings, wherein.

DETAILED DESCRIPTION

Several exemplary embodiments of the application are described with reference to FIG. 1 to FIG. 7, which are generally relate to a charging method for proximity-based service (ProSe) communication utilized in a user equipment (UE), an evolved Node B (eNB) and a mobility management entity (MME).

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3GPP specifications described herein are used to teach the spirit of the invention, and the invention is not limited thereto.

In 3GPP specifications, a base station is typically referred to as a Node B, an evolved or enhanced Node B (eNB), a home enhanced or evolved Node B (HeNB) or some other similar terminology. As the scope of the invention should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote a wireless communication device and/or a base station.

Figure 1:
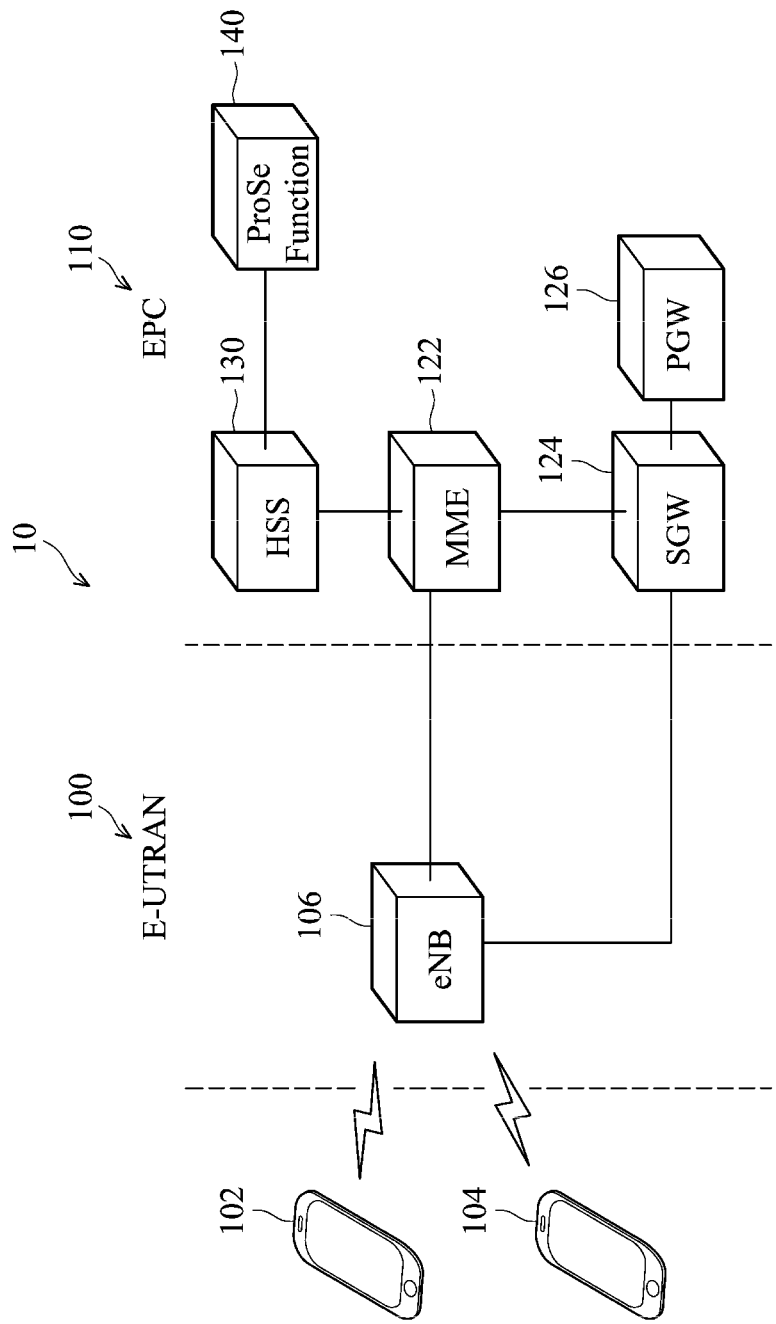
FIG. 1 illustrates an exemplary communication network including a ProSe (Proximity-based Service) function according to an embodiment of the present invention.

FIG. 1 illustrates an exemplary wireless communications system 10 including a ProSe (Proximity-based Service) function 140 according to an embodiment of the present invention. The wireless communications system 10 includes a first UE 102, a second UE 104, an evolved UMTS terrestrial radio access network (E-UTRAN) 100 and an Evolved Packet Core (EPC) 110. The E-UTRAN includes one or more evolved Node B (eNB) 106, and the EPC 110 includes a mobility management entity (MME) 122, a serving gateway (SGW) 124, a packet data network gateway (PGW) 126, a home subscriber server (HSS) 130, and a proximity-based service (ProSe) function 140. The MME 122, the SGW 124, and the PGW 126 can be implemented in a gateway. In some embodiments, the SGW 124 and PGW 126 can be implemented on separate network devices.

The MME 122 manages mobility for the UEs. No user data packets go through the MME 122. The MME 122 is configured to perform authentication and authorization functions, non-access stratum (NAS) signaling, security negotiations, serving gateway and/or PGW selection, and UE reachability.

The MME 122 and the SGW 124 act as a foreign agent for a mobile IP session. The SGW 124 forwards and receives packets to and from the base station(s) where the first UE 102 or the second UE 104 is being served.

The PGW 126 acts as an interface connecting to an external packet networks (e.g., the Internet or operator's IP service center).

The PGW 126 may also include a policy and charging enforcement function (PCEF). The PCEF provides service data flow detection, user plane traffic handling, triggering control plane session management, Quality of Service (QoS) handling, service data flow measurement, as well as online and offline charging interactions. The PCEF enforces the policy control as indicated by a policy control and charging rules function (PCRF).

The HSS 130 is connected to the MME 122 and is used to store a record for each subscriber to the wireless communications system 10. The subscriber record includes Evolved Packet System (EPS) Subscribed Charging Characteristics, a subscription profile, authentication vectors, and a list of allowed Access Point Names (APNs) for each subscriber. Each APN has a list of allowed PGWs for the subscriber. An APN may be considered as the network name (e.g., Internet, corporate intranet, etc.).

The ProSe function 140 is connected to the HSS 130, and is used to authorize the first UE 102 and the second UE 104 to use the ProSe service, such as to transmit/receive data or signal directly and to use any other features provided by the ProSe function 140. For example, a ProSe service can be a ProSe communication, or a ProSe direct discover. Note that the signaling path between the ProSe function and the UE can traverse through one or more network entities. For example, if only one signaling is applied, the signaling path is via direct interface between the ProSe function and the UE; and if traversing more than one network entity, the ProSe function may have interface connecting to the MME so that the signaling path is traversed through ProSe function, MME and the eNB. Considering direct interface between the UE and the ProSe function, when the first UE 102 or the second UE 104 is authorized to use the ProSe Communication to transmit a proximity request, the ProSe function 140 retrieves the EPS subscribed charging characteristics recorded in the HSS 130 and provides the EPS subscribed charging characteristics to the first UE 102 and the second UE 104.

Figure 2:
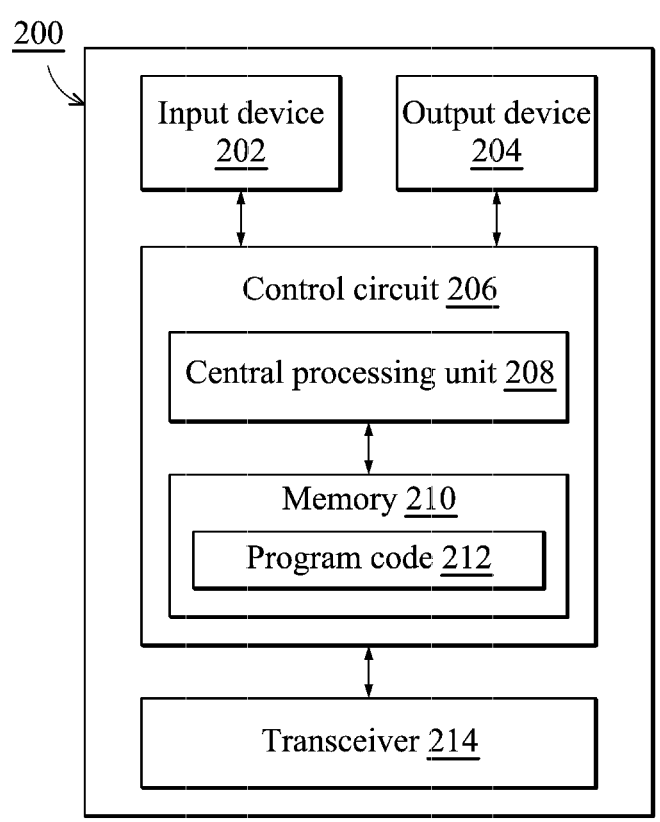
FIG. 2 shows an alternative simplified functional block diagram of a communications device according to one embodiment of the present invention.

FIG. 2 shows an alternative simplified functional block diagram of a communications device 200 according to one embodiment of the present invention. As shown in FIG. 2, the communication device 200 can be the UE 102 or 104, the eNB 106, the MME 130, or the ProSe function 140 in the wireless communications system 10 of FIG. 1, and the communications device 200 is preferably used in the LTE system, the LTE-A system or any other similar wireless communications system. The communications device 200 may include an input device 202, an output device 204, a control circuit 206, a central processing unit (CPU) 208, a memory 210, a program code 212, and a transceiver 214. The control circuit 206 executes the program code 212 in the memory 210 through the CPU 208, thereby controlling the operation of the communications device 200. The communications device 200 can receive signals input by a user through the input device 202, such as a keyboard keypad, touch screen, or microphone (for voice input), and can output images and sounds through the output device 204, such as a screen or speakers. The transceiver 214 is used to receive and transmit wireless signals, deliver received signals to the control circuit 206, and output signals generated by the control circuit 206 wirelessly.

Figure 3:
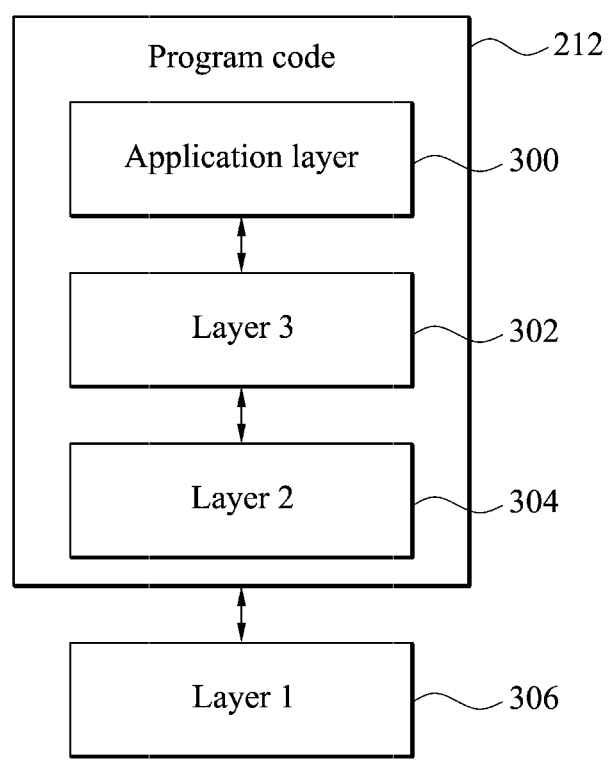
FIG. 3 is a simplified block diagram of the program code shown in FIG. 2 in accordance with one embodiment of the invention.

FIG. 3 is a simplified block diagram of the program code 212 shown in FIG. 2 in accordance with one embodiment of the invention. In this embodiment, the program code 212 includes an application layer 300, a Layer 3 302, and a Layer 2 304, and is coupled to a Layer 1 306. The application layer 300 performs signaling/data/media information exchange via user plane messages, i.e. it is required that the UE has IP connectivity with the network. For example, if user plane interface is applied between a UE and a ProSe function, the UE needs to obtain IP connectivity and then can start to communicate with ProSe function. The Layer 3 302 generally performs mobility management, e.g. the MME 122 and the UE 102 use NAS messages to exchange location information and attachment status, etc. The Layer 2 304 generally performs radio resource control and link control. The Layer 1 306 generally performs physical connections.

Please note that, in the following embodiments, a ProSe service established between the UEs takes a ProSe communication (which means two UEs has ongoing data/signal transmission in between) as an example for simplicity. However, ProSe communication is not the only service that UEs can use and another ProSe service, e.g., ProSe discovery, which is for a UE to discover the other UE in proximity, can also be the service addressed in the following embodiment.

Figure 4:
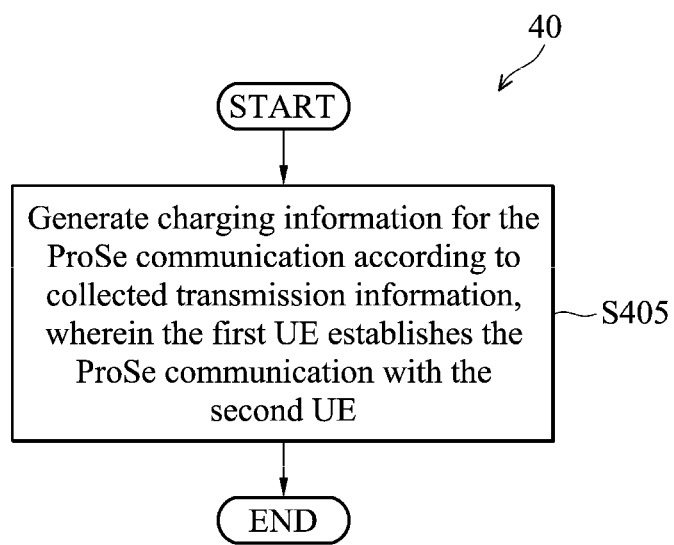
FIG. 4 is a flow chart of a process illustrating a charging method for the ProSe communications according to an embodiment of the invention with reference to FIG. 1.

FIG. 4 is a flow chart of a process 40 illustrating a charging method for the ProSe communication according to an embodiment of the invention with reference to FIG. 1. The process 40 is used in the eNB. In step S405, the eNB generates charging information for the ProSe communication according to collected transmission information, wherein the first UE establishes the ProSe communication with the second UE.

In the embodiment, the transmission information may comprise at least one of the following information:
radio resources dedicated for the ProSe communication (or ProSe discovery) between a first UE and a second UE (e.g. UE 102 and UE 104 in FIG. 1) allocated to the first UE or the second UE or both;
at least one traffic volume report transmitted from the first UE, or the second UE, or both;
a time-elapsed duration for the ProSe communication between the first UE and the second UE.

Note that the charging information may be a charging data record (CDR) and comprises at least one information as follows: an Evolved Packet System (EPS) bearer identity, a charging identity (which may be generated by the PGW and transmitted to the eNB), the uplink data volume or the downlink data volume indicated by the traffic volume report carried in the transmission information, time-elapsed duration carried in the transmission information, charging event including event change condition and event change time information, user location information (e.g. CGI/TAI), EPC QoS Information, etc. Please note that the charging event may be the start/stop of the ProSe communication, and the charging event can be configured on the eNB or obtained by the eNB from the received charging characteristics from the MME. Furthermore, when the first UE is in uplink transmission and the second UE is in downlink transmission, the radio resources may comprise an uplink grant for the first UE to transmit data of the ProSe communication to the second UE, or a downlink assignment for the second UE to receive the data of the ProSe communication transmitted from the first UE. On the other side, when the first UE is in downlink transmission and the second UE is in uplink transmission the radio resources may comprise an uplink grant for the second UE to transmit data of the ProSe communication to the first UE, or a downlink assignment for the first UE to receive the data of the ProSe communication transmitted from the second UE. Besides, the eNB can also know the time duration for the ProSe communication between the first UE and the second UE since the eNB knows how long the allocated radio resource dedicated for the ProSe communication is used. In addition, the traffic volume report may comprise at least one of an uplink traffic volume, or a downlink traffic volume, or both. Further, if the traffic volume report indicates at least one uplink traffic volume (whatever it is transmitted from the first UE or from the second UE), the traffic volume report may be a buffer status report.

In one embodiment, next to the process 40, the eNB may transmit the charging information to the SGW for processing the charging information, via MME or directly from the eNB, to generate a SGW charging data record (SGW-CDR). Note that if dynamic policy and charging control (PCC) mechanism is provided, the PCEF (Policy and Charging Enforcement Function) is equipped in the PGW and the PCEF of the PGW connecting with an online charging function (ONCE) or an offline charging function (OFCF) needs to retrieve the charging information from the eNB.

In another embodiment, the eNB may transmit a request message to the first UE or the second UE to request the first UE or the second UE to transmit the traffic volume report, wherein the request message may be a MAC control element, an RRC message or a NAS message. Then, the first UE transmits a response message including the traffic volume report to the eNB for generating the charging information, wherein the response message may be a MAC control element, an RRC message, a NAS message, or a new message.

Figure 5:
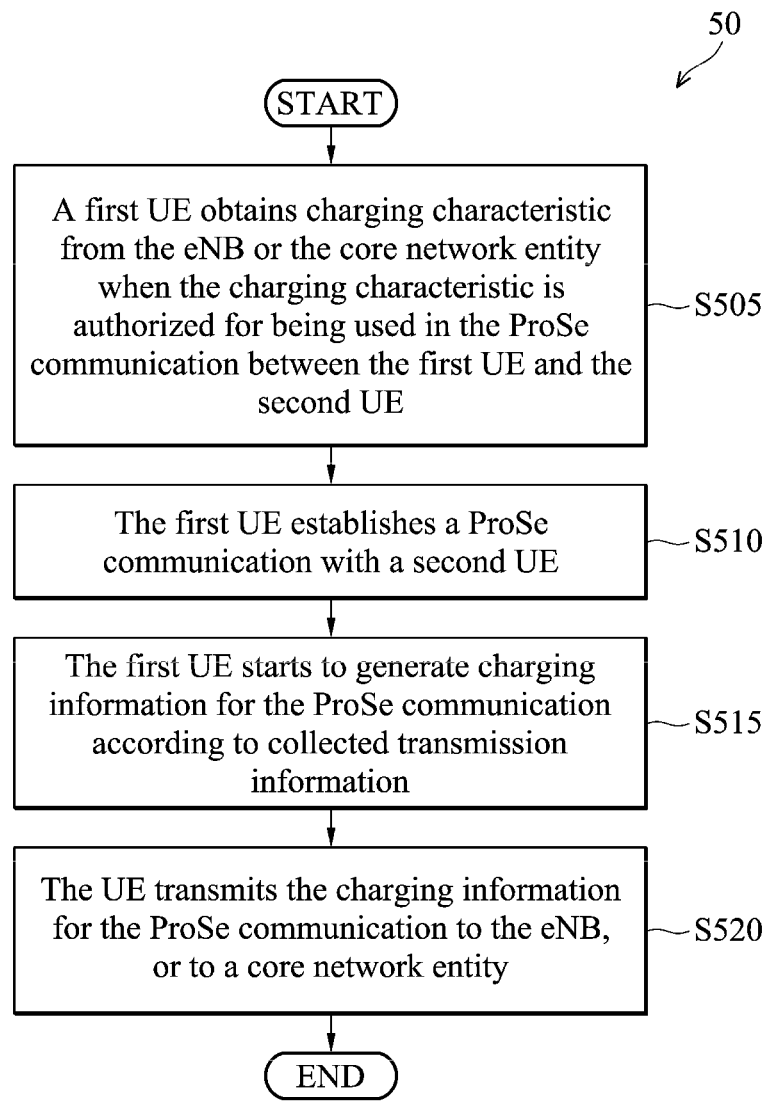
FIG. 5 is a flow chart of a process illustrating a charging method for the ProSe communications according to an embodiment of the invention with reference to FIG. 1.

FIG. 5 is a flow chart of a process 50 illustrating a charging method for the ProSe communication according to an embodiment of the invention with reference to FIG. 1. The process 50 is used in a UE (called first UE hereafter) which has a ProSe communication with another UE (called as second UE hereafter). In Step S505, a first UE obtains charging characteristic from the eNB or the core network entity (e.g. MME or ProSe function) when the charging characteristic is authorized for being used in the ProSe communication between the first UE and the second UE. In Step S510, the first UE establishes a ProSe communication with a second UE. After the ProSe communication is established, in Step S515 the first UE starts to generate charging information for the ProSe communication according to collected transmission information, wherein the transmission information comprises at least one of the following:

radio resources dedicated for the ProSe communication (or ProSe discovery), allocated to the first UE by the eNB;
  traffic volume report transmitted to the eNB; and
  a time-elapsed duration for the ProSe communication.

Next, in Step S520 the UE transmits the charging information for the ProSe communication to the eNB, or to a core network entity (e.g. MME, ProSe function, PGW or SGW).

Please note that, the collected transmission information and the charging information generated accordingly in the process 50 for UE are similar to those in the process 40 for eNB. That is, the charging information generated by the process 50 may also comprise at least one information as follows: an EPS bearer identity (which is received from the eNB), a charging identity (which is generated by the PGW and transmitted to the UE via the MME), the uplink data volume or the downlink data volume indicated by the traffic volume report to be transmitted to the eNB, time-elapsed duration for the ProSe communication between the first UE and the second UE, charging event including event change condition and event change time information, user location information (e.g. CGI/TAI), EPC QoS Information, etc. Please note that the charging event may be the start/stop of the ProSe communication, and the charging event can be configured on the UE or obtained by the UE from the received charging characteristics from the eNB or a core network entity (e.g. a SGW, PGW, MME, or ProSe function). The charging information can be a Charging Data Record (CDR).

Please note that the transmission of the charging information may be in response to a request message sent from the eNB or the core network entity (e.g., SGW, PGW MME, or ProSe function).

Figure 6:
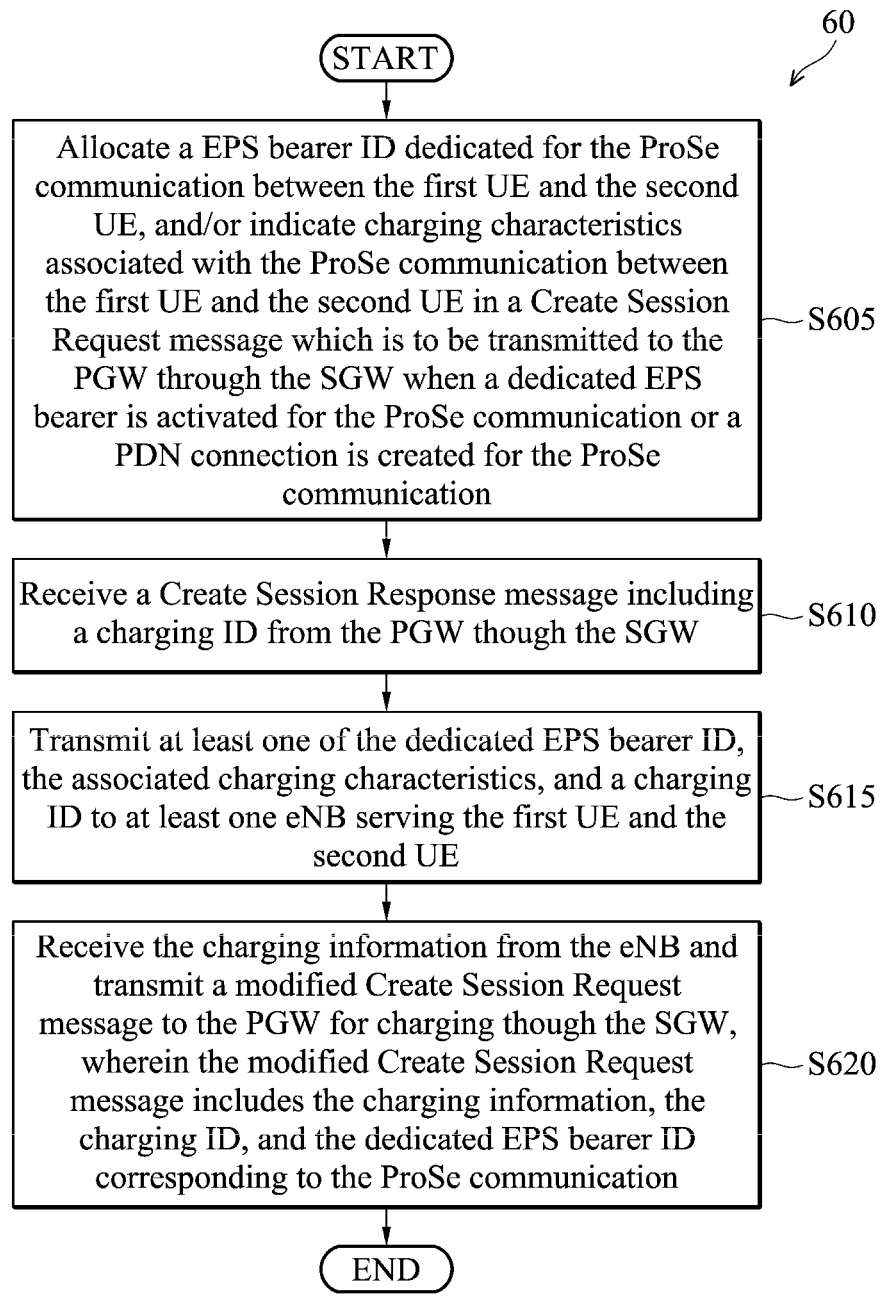
FIG. 6 illustrates a flow chart of a process illustrating a charging method for the ProSe communications according to an embodiment of the present invention.

FIG. 6 is a flow chart of a process 60 illustrating a charging method for the ProSe communications according to an embodiment of the invention with reference to FIG. 1. The process 60 is used in the MME. In Step S605, the MME allocates a EPS bearer ID dedicated for the ProSe communication (or ProSe discovery) between the first UE and the second UE, and/or the MME indicates charging characteristics associated with the ProSe communication (or ProSe discovery) between the first UE and the second UE in a Create Session Request message which is to be transmitted to the PGW through the SGW when a dedicated EPS bearer is activated for the ProSe communication (or ProSe discovery) or a PDN connection is created for the ProSe communication (or ProSe discovery). Then, in Step S610, the MME receives a Create Session Response message including a charging ID from the PGW though the SGW. Next, in Step S615, the MME transmits at least one of the dedicated EPS bearer ID, the associated charging characteristics, and a charging ID to at least one eNB serving the first UE and the second UE. After that, in Step S620, the MME receives the charging information from the eNB and transmits a modified Create Session Request message to the PGW for charging though the SGW, wherein the modified Create Session Request message includes the charging information, the charging ID, and the dedicated EPS bearer ID corresponding to the ProSe communication.

In another embodiment, the MME may transmit a request message to request the first UE to transmit the transmission information. In this situation, the first UE may transmit a response message including the transmission information to the MME via the eNB, so that the MME is able to generate charging information according to the response message. It should be noted that the request message and the response message may be a MAC control element, a RRC message or a NAS message. If the response message is a NAS message, the MME may generate charging information according to the NAS message instead of the eNB, and transmit the charging information to the PGW for charging through the SGW. In the last, the MME transmits the charging information to the PGW through the SGW for processing the charging information.

In another embodiment, not only the MME but also the other core network entity can use the charging method of the present invention, such as a ProSe function (as the ProSe function 140 shown in FIG. 1). As the mentioned previously, the ProSe function is a core network entity connected to the HSS, for authorizing the first UE 102 and the second UE 104 to use the ProSe communication and another ProSe-related features, e.g. ProSe discovery. Since the UEs are authorized to use PoSe communication, the ProSe function may retrieve necessary information for charging from the UEs. Take the ProSe function 140 in FIG. 1 as an example, the ProSe function 140 can retrieve the EPS subscribed charging characteristics recorded in the HSS 130 and provides the EPS subscribed charging characteristics to the first UE 102 and the second UE 104. Therefore, the ProSe function may generate charging information for a ProSe communication between the first UE and the second UE according to collected transmission information, and may further transmit the charging information to the Packet Data Network Gateway (PGW) for processing the charging information.

Transmission information collected by the ProSe function comprises at least one of the following:
  at least one traffic volume report corresponding to uplink or downlink data volume, transmitted from the first UE and/or the second UE;
  a time-elapsed duration for the ProSe service, e.g. ProSe communication or ProSe discovery; and
  the number of times for which the authorization for the ProSe service, e.g., ProSe communication or ProSe discovery, is accepted by the core network entity.

Please note that the ProSe function may generate the charging information by request. For example, the UEs in ProSe service may send a request message to the ProSe function, and in response to the request message (which can be the request for authorization for the ProSe service), the ProSe function generates the charging information. In another embodiment, the ProSe function may transmit a request message to request the UEs to transmit the transmission information associated with charging information, and in this situation, the ProSe function may further receive one or more messages carrying transmission information in response. The charging information that the ProSe function generated can be a Charging Data Record (CDR), including at least one information as described in the above. Furthermore, the charging information that the ProSe function generated may include the number of times for which the authorization is accepted by the ProSe function.

In addition, the CPU 308 could execute the program code 312 to perform all of the above-described actions and steps in the process 40, 50, or 60 or others described herein.

Figure 7:
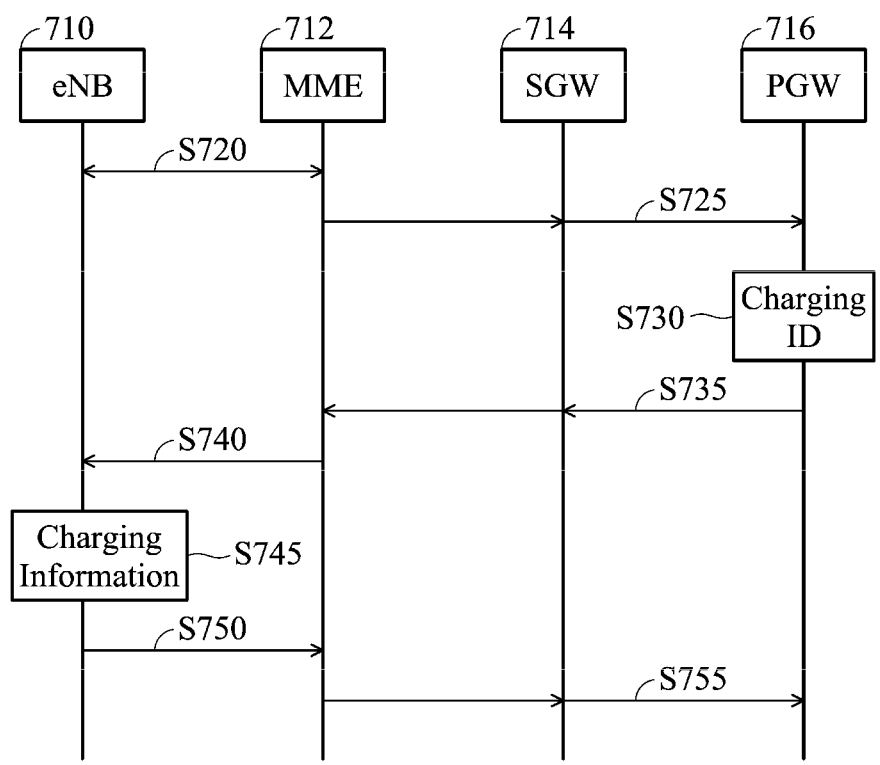
FIG. 7 illustrates a flow diagram for a charging method according to an embodiment of the present invention.

FIG. 7 illustrates a flow diagram for a charging method according to an embodiment of the present invention. FIG. 7 includes an eNB 710, a MME 712, a SGW 714 and a PGW 716. In S720, a dedicated EPS bearer is activated for the ProSe communication or a PDN connection is created for the ProSe communication. In S725, the MME 712 allocates a dedicated EPS bearer ID for the ProSe communication and/or indicates associated charging characteristics in a Create Session Request message to be transmitted to the PGW 716 though the SGW 714. In S730, the PGW 716 generates a charging ID for the ProSe communication. In S735, the PGW 716 transmits a Create Session Response message including the charging ID to the MME 712 though the SGW 714. In S740, the MME 712 transmits at least one of the dedicated EPS bearer ID, the associated charging characteristics, and the charging ID to the eNB 710. In S745, the eNB 710 generates the charging information for the ProSe communication according to the transmission information. In S750, the eNB 710 transmits the charging information to the MME 712 when a configured charging event occurs. In S755, the MME 712 transmits a modified Create Session Request message to the PGW 716 through the SGW 714 for processing the charging information, wherein the modified Create Session Request message includes the charging information, the charging ID, and the EPS bearer ID corresponding to the ProSe communication.

Please note that the eNB 710 may transmit charging information to SGW directly without traversing to MME. In this case, the eNB transfers the stored charging characteristics and allocated EPS bearer ID by the MME to the SGW/PGW. In return, the PGW also provides the charging ID and transfers to the eNB via SGW.

In view of the aforementioned descriptions, the present invention proposes a charging method for ProSe communication for a UE, an eNB, an MME and related communications devices, such that the eNB or the MME may obtain the charging information when the UEs communicate with each other directly via the ProSe communication in a data path and/or a control path.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A charging method for proximity-based Service (ProSe), wherein the charging method is used in a mobility management entity (MME) of a wireless communication system, the method comprising:
   allocating an evolved packet system (EPS) bearer identity (ID) dedicated for a ProSe service established by a first user equipment (UE) for communicating with a second UE and/or indicating charging characteristics associated with the ProSe service between the first UE and the second UE in a Create Session Request message which is to be transmitted to a packet data network gateway (PGW) through a serving gateway (SGW), when a dedicated EPS bearer is activated for the ProSe service or when a dedicated PDN connection is created for the ProSe service;
   receiving a Create Session Response message including a charging ID from the PGW through the SGW; and
   transmitting at least one of the dedicated EPS bearer ID, the associated charging characteristics, and a charging ID to at least one evolved Node B (eNB) serving the first UE and the second UE.

2. The charging method for proximity-based service as claimed in claim 1, further comprising:
   receiving charging information from the eNB when a charging event occurs; and
   transmitting a modified Create Session Request message to the PGW for charging through the SGW,
   wherein the modified Create Session Request message includes the charging information, the charging ID, and the dedicated EPS bearer ID corresponding to the ProSe service.

3. The charging method for proximity-based service as claimed in claim 1, further comprising:
   transmitting a request message to request the first UE to transmit transmission information;
   receiving a response message in response to the request message from the first UE via the eNB; and
   generating charging information according to the response message;
   transmitting the charging information to the PGW for processing the charging information, through the SGW, wherein the response message is a non-access stratum (NAS) message and comprises at least one traffic volume report transmitted from the first UE.

* * * * *